July 28, 1964  W. E. KELSEY ETAL  3,142,190
RATIO CONTROL SYSTEM FOR TOROIDAL TRANSMISSION
Filed Feb. 20, 1963  5 Sheets-Sheet 1

Fig. 1

INVENTORS
WILLIAM E. KELSEY
WERNER H. HELLER
BY
ATTORNEY

FIG. 2

INVENTORS
WILLIAM E. KELSEY
WERNER H. HELLER
BY
ATTORNEY

July 28, 1964 W. E. KELSEY ETAL 3,142,190
RATIO CONTROL SYSTEM FOR TOROIDAL TRANSMISSION
Filed Feb. 20, 1963 5 Sheets-Sheet 5

FIG. 6

INVENTORS
WILLIAM E. KELSEY
WERNER H. HELLER
BY
ATTORNEY

United States Patent Office 3,142,190
Patented July 28, 1964

3,142,190
RATIO CONTROL SYSTEM FOR TOROIDAL
TRANSMISSION
William E. Kelsey, Glen Ridge, and Werner H. Heller,
Lodi, N.J., assignors to Curtiss-Wright Corporation, a
corporation of Delaware
Filed Feb. 20, 1963, Ser. No. 259,983
11 Claims. (Cl. 74—200)

This invention relates to toroidal-type variable speed-ratio transmissions and particularly to a novel and improved control system for such transmissions.

Transmissions of this type generally comprise a pair of co-axial input and output drive members having facing toroidal or toric surfaces with a plurality of rollers disposed between and in friction contact with said surfaces and with each roller mounted for speed-ratio-changing movement to change the speed-ratio of the driving connection provided by the rollers between the toroidal members. The tangential traction force on each roller is opposed by a controllable force such that any unbalance between said control force and the tangential traction drive force causes the roller to move in a manner inducing speed-ratio-changing movement of the roller to a position in which the forces on said roller are again in balance. A transmission of this type is disclosed in United States Patent 3,008,337 issued on November 14, 1961.

A co-pending application Serial No. 259,982, filed February 20, 1963 and entitled "Ratio Control for Toroidal Transmission" invented by Michael Davis et al., discloses a feedback system which is responsive to speed-ratio-changing or pivotal movement and translational movement of the rollers for eliminating hunting of the rollers about a desired speed-ratio roller position. The feedback system disclosed in said co-pending application overcomes the drawback of roller hunting present in prior art devices in that the rollers of said co-pending application may be set to a desired speed-ratio position and the feedback will substantially maintain the rollers in said desired speed-ratio for wide variations in input speed and output load without any hunting.

The present invention relates to a novel and improved control system of the type disclosed in said co-pending application which is of more rugged construction, enables more precise control of the roller position and has means enabling control of the roller position for forward and reverse operation of transmission rotation. The invention is generally carried out by providing a servo-valve control assembly for regulating hydraulic control pressure to the roller pivot shafts for applying a fluid control force which upon being varied will induce translational movement of said pivot shafts with resulting speed-ratio-changing movement of the rollers. The servo-valves within the servo valve control assembly are placed in abutting relationship with a cam means supported by said roller pivot shafts with relative movement with said cam means inducing linear displacement of the servo valves for varying the hydraulic pressure to said pivot shafts. The arrangement is such that any relative rotation between said cam means and said assembly or any translational movement of said pivot shafts will induce linear displacement of said servo valves. A reversing valve switch is provided in the servo valve control assembly which operatively connects one of said servo valves into the fluid pressure system according to the direction of transmission rotation. A control pressure assembly is also provided which has means for regulating the fluid output pressure required from the control system pump so that the pump can be operated so as to supply only the fluid pressure required for maintaining adequate control pressure to the pivot shafts. Means are also provided for supplying fluid pressure to a piston loader mechanism for maintaining axial loading on the input drive member with the rollers so that friction contact between the drive members and the rollers is maintained for all speed-ratio pressure changes on the said pivot shafts. The fluid pressure to the piston loader mechanism is regulated so that the friction contact between the input drive member and the rollers is a function of the torque transmitted by the transmission as will be explained in greater detail below.

Accordingly one object of the invention is to provide a novel and improved speed-ratio control system for variable speed-toroidal-type transmission wherein the rollers may be accurately balanced at a desired speed-ratio position regardless of the direction of rotation of said transmission.

It is further an object of the invention to provide a novel and improved speed-ratio control system for variable speed-toroidal-type transmission which will hold a selected speed-ratio regardless of the direction of torque applied to said transmission.

Another object of the invention is to provide a novel and improved speed-ratio control system which is of relatively simple construction and is capable of precise controlling of the speed-ratio positioning of the rollers.

It is another object of the invention to provide a novel and improved speed-ratio control system which is rugged in construction and through which precise control of the system may be obtained with minimum control losses present in said system.

It is an additional object of the invention to provide a control pressure system for balancing pump output pressure in accordance with roller positioning requirements such that the pump outlet pressure is a function of the torque transmitted and such that minimum energy requirements will be needed for operating said pump.

It is still another object of the invention to provide a hydraulic loading system for maintaining driving contact between the drive members and the rollers which system is controlled in accordance with roller speed-ratio position and torque transmitted such that for all speed-ratio positions of said rollers, said drive members and said rollers are kept in driving contact.

Other objects and advantages of the invention will become apparent upon reading the following detailed description with the accompanying drawing in which:

FIG. 4 is an enlarged view of a type of pump assembly which may be used in the control system of FIG. 3;

Figure 1:
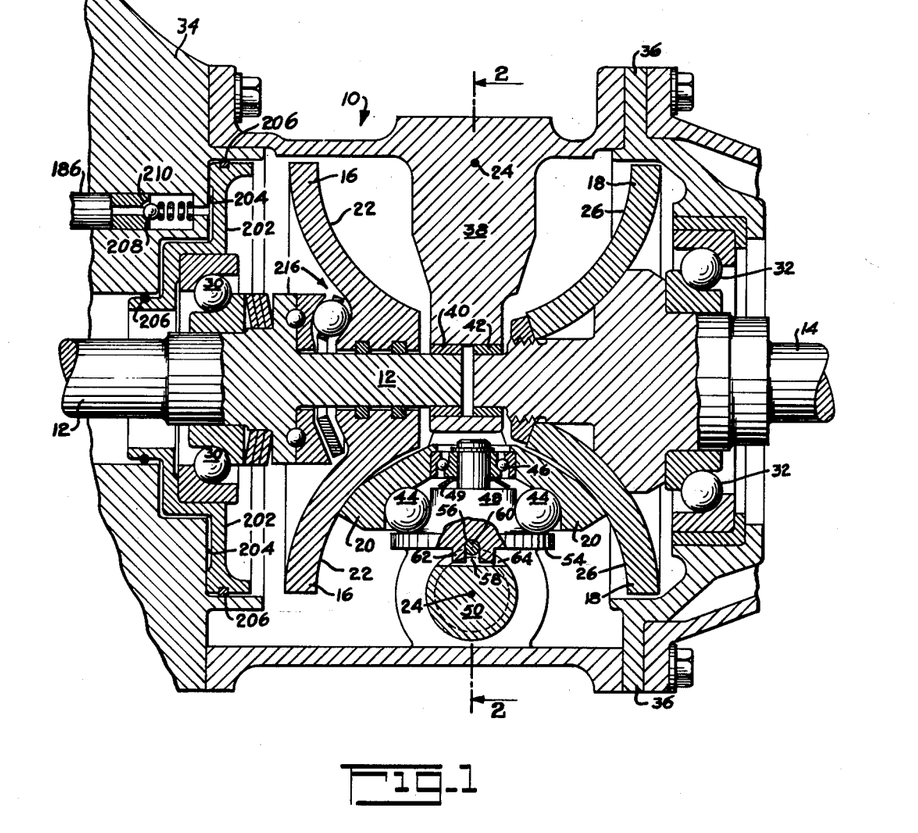
FIG. 1 is an axial sectional view through the transmission embodying the invention.
Figure 2:
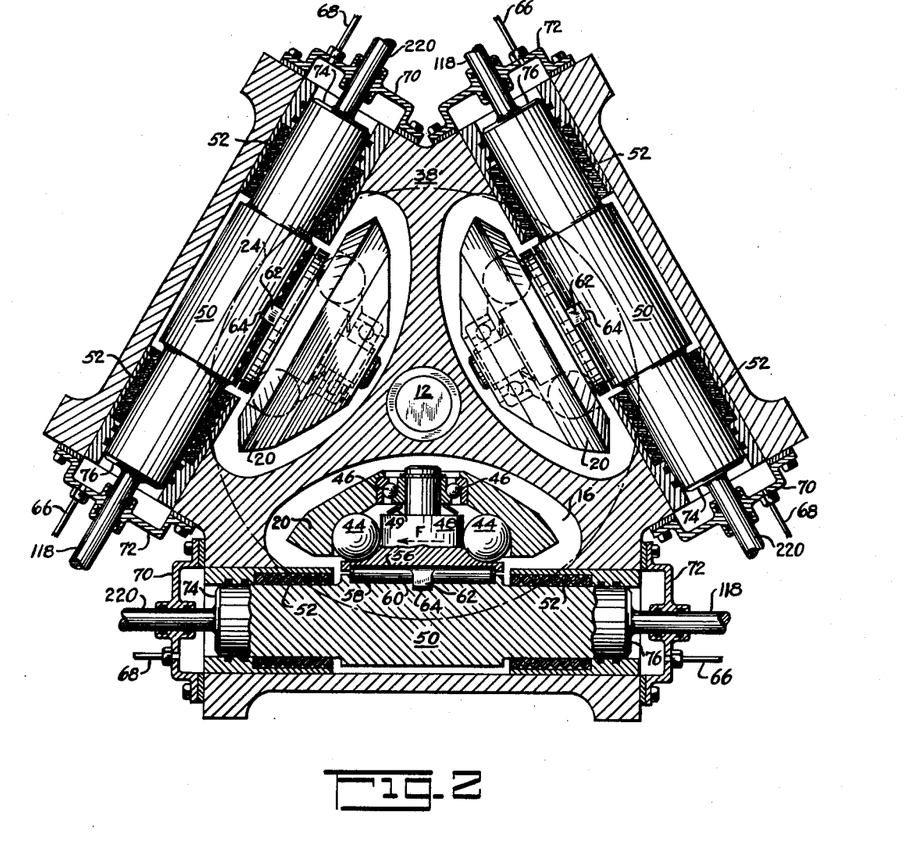
FIG. 2 is a sectional view taken along line 2—2 of FIG. 1 but showing the rollers and their supporting structure in elevation.

Referring now to FIGS. 1 and 2 of the drawings, a transmission 10 is illustrated as comprising co-axial input and output shafts 12 and 14 respectively, input and output toroidal disc members 16 and 18 co-axially mounted on and drivably connected to the shafts 12 and 14, respectively, and a plurality of circumferentially-spaced rollers 20 disposed between and in driving engagement with the toric surfaces of the disc members 16 and 18. Preferably, as illustrated, three rollers 20 are provided between the toroidal members 16 and 18. Also, at least one of the toroidal disc members 16 and 18 is axially movable toward the other. For this purpose the disc member 16 is supported on the input shaft 12 for axial movement therealong.

The input toroidal disc member 16 has a toroidal surface 22 which preferably is generated by rotating a substantially circular arc about the common axis of the input and output shafts 12 and 14, the center of the generating arc tracing the circle 24 as the toric surface 22 is generated. The output toroidal disc member 18 has a similar toroidal surface 26 facing the input toroidal surface 22 and having substantially the same toric center circle 24.

The shafts 12 and 14 are supported by bearings 30 and 32 in a multipart housing including end sections 34 and 36 and an intermediate section 38 secured to said end sections. The intermediate housing section 38 is a Y-shaped frame structure between which the three rollers 20 are disposed, said Y-shaped structure providing end bearings 40 and 42 for the adjacent ends of the shafts 12 and 14.

Each roller 20 is journaled by bearings 44 and 46 on a spindle 48, said bearings being designed to support its roller against radial loads and to support its roller 20 against thrust radially outward along its spindle 48, the axis of each said spindle 48 being substantially radial relative to the transmission axis. A spring 49, preferably in the form of a Belleville washer, is disposed between the inner race of the bearing 46 and a shoulder on the spindle 48 so that the axial thrust on the roller 20 serves through its bearing 46 to compress the spring 49 thereby to distribute the axial thrust between the bearings 44 and 46. Since the Belleville spring 49 is between the bearing 46 and the spindle 48 it serves to limit the thrust load carried by said bearing 46, said bearing 46 having a substantially smaller load carrying capacity than the bearing 44.

Each roller spindle 48 is supported by a pivot shaft 50 for speed-ratio-changing movement of its roller about the axis of its said pivot shaft 50 and relative to the toric surfaces 22 and 26. Relative to the transmission axis, each roller 20 is disposed on the radially inner side of its associated pivot shaft 50. The axis of each pivot shaft 50 is substantially tangent to the toroidal center circle 24 and is disposed in a plane perpendicular to the transmission axis. Thus, the pivot shafts 50, like the rollers 20, are circumferentially-spaced about the transmission axis, there being one pivot shaft 50 for each roller.

Each pivot shaft 50 is journaled on bearings 52 carried by the intermediate housing section 38. Each roller spindle 48 has an end plate 54 having a substantially semi-cylindrical groove 56 facing a corresponding groove 58 in the surface of an enlarged central portion of its associated pivot shaft 50. Each such semi-cylindrical groove 56 and 58 is disposed parallel to the axis of its associated pivot shaft 50. A pin 60 is received in each facing pair of grooves 56 and 58 so that through its pin 60 the associated roller 20 is supported by the shaft 50 for speed-ratio-changing movement of the roller with and about the axis of its shaft 50.

Each pin 60 also permits a limited pivotal movement of its associated roller 20 about the axis of said pin to equalize the contact pressures of said roller against the toric surfaces 22 and 26.

Each pivot shaft 50 has a limited movement along its axis and its associated roller spindle end plate 54 has tongues lugs 62 received within a cross-slot or groove 64 in the shaft 50 so that movement of a shaft 50 along its axis results in a corresponding movement of its roller 20 in this direction. Obviously, since the cross-slot 64 on each pivot shaft 50 is disposed at right angles to the adjacent pin 60, this engagement between each pivot shaft cross-slot 64 and the roller spindle lugs 62 does not interfere with limited pivotal movement of the associated roller spindle 54 about the axis of the pin 60 to equalize the contact pressures of the associated roller 20 against the toric surfaces 22 and 26.

The direction of rotation of the transmission is such that as viewed in FIG. 2 the input toric member 16 rotates clockwise and therefore the traction forces F exerted by the toric members 16 and 18 on, for example, the lower roller 20 are directed toward the left. Any unbalance of the traction forces on a roller and the forces along and on its pivot shaft 50 results in movement of the roller and its pivot shaft 50 along the axis of said shaft. As fully explained in the aforementioned patent, such movement of a roller 20 along the axis of its pivot shaft 50 results in speed-ratio-changing pivotal movement of the roller with and about the axis of its pivot shaft 50 to a speed-ratio position in which said forces are again in balance.

As is known, speed-ratio-changing precession of the rollers may also be produced by tilting of each roller about an axis through or parallel to a line through the points of contact of the roller with the toric members 16 and 18. As is also disclosed in said patent, if such a roller tilt axis is offset from a line through the roller points of contact with the toric members, then the traction forces exerted by the toric members 16 and 18 on each roller apply a turning moment on the roller about its tilt axis which may be balanced by the hydraulic control force. Accordingly, it is within the scope of this invention to use such roller tilting to induce speed-ratio-changing precession of the rollers instead of shifting of each roller along the axis of its pivot shaft 50.

As stated above precessional movement of the roller 20 may be induced by translation of the pivot shafts 50 along their axes. For this purpose, fluid control pressure may be applied to both ends of the pivot shafts 50 through conduits 66 and 68 which terminate at cylinders 70 and 72, respectively, supported at each end of the pivot shafts 50. The end faces 74 and 76, respectively, of each pivot shaft 50 serve as piston faces upon which the force of the hydraulic pressure may act to induce translational movement of said pivot shafts 50, as fully explained in said co-pending application.

Figure 3:
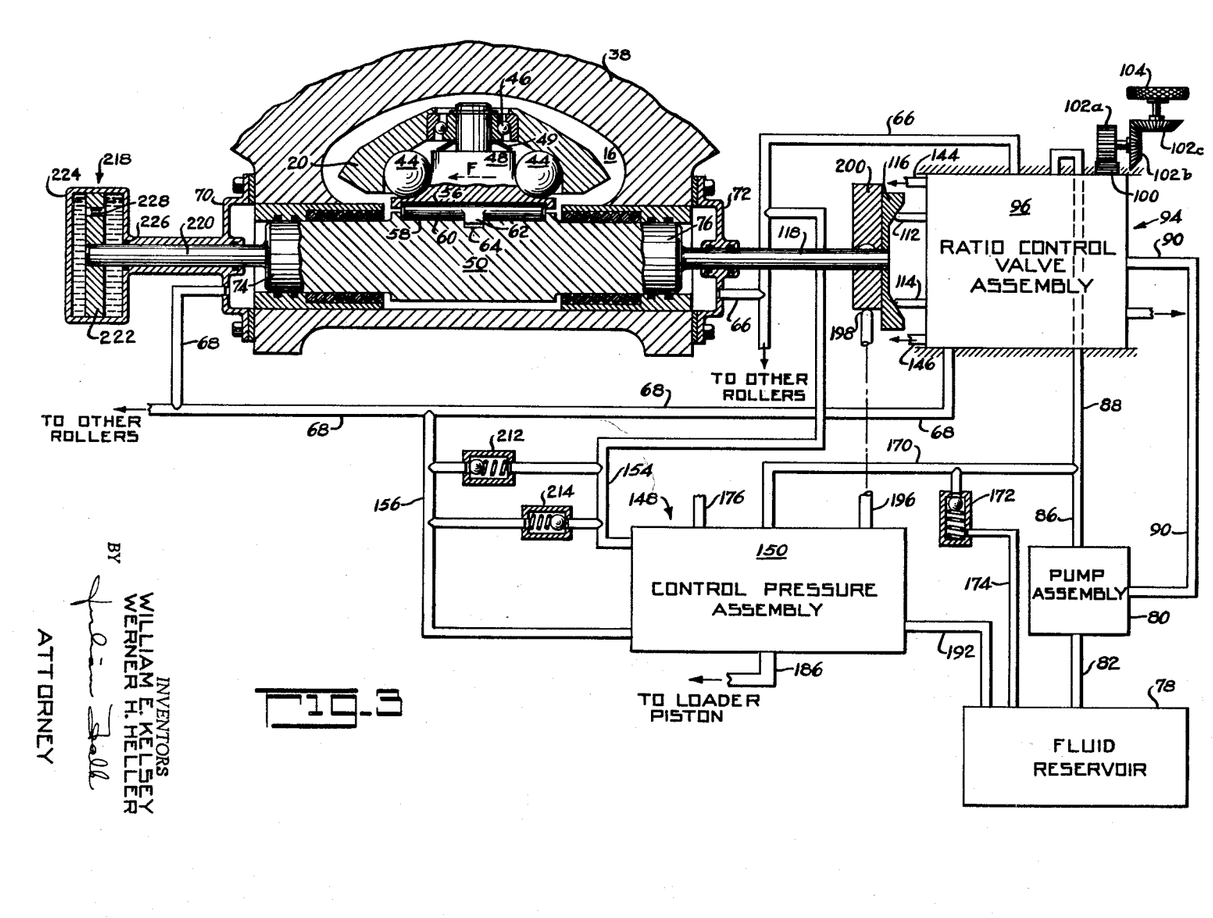
FIG. 3 is an enlarged sectional view of one of the rollers of FIG. 1 and its supporting structure with the control system of the invention shown diagrammatically.
Figures 4, 7, 7A:
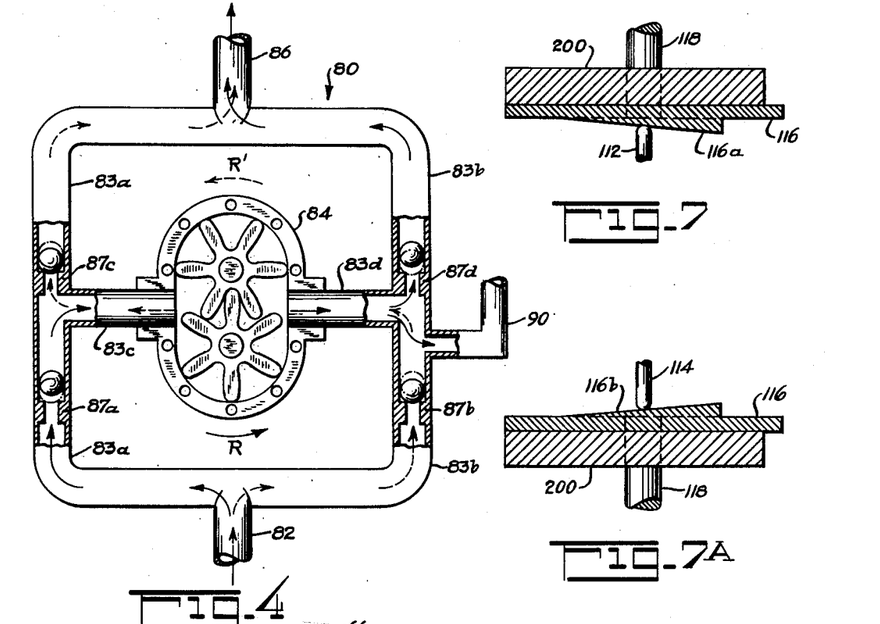

In order to control the speed-ratio position of the rollers a novel controllable hydraulic system is provided and is diagrammatically illustrated in FIG. 3. As shown in said figure, a suitable fluid reservoir 78 is provided to which a pump assembly, generally designated at 80, is connected for pumping hydraulic fluid from the reservoir to the control assembly. FIG. 4 shows a more detailed view of the pump assembly which may comprise a conduit 82 leading from the fluid reservoir 78 and dividing into two branch conduits 83a and 83b. The conduits 83a and 83b have conduits 83c and 83d connected thereto which in turn lead to and from a suitable pump, such as gear-type pump 84, depending upon the direction of flow in and out of the pump 84. The pump 84 may be driven by the input shaft 12 of the transmission 10 and may be suitably connected thereto.

The transmission of the invention is designed so that the rotation may be reversed and in order that the fluid flow from the pump 84 always will be in a direction so as to flow outwardly through the pump output conduit 86, check valves 87a, 87b and 87c, 87d are provided in conduits 83a and 83b, respectively. The solid and dotted arrows indicate the direction of flow of the fluid for forward or reverse direction of the transmission. Referring to the solid arrows of FIG. 4, it can be seen that the fluid flow will be into the pump assembly 80 through conduit 82 into conduit 83a forcing the check valve 87a to open while the pump output keeps the check valve 87b closed. The fluid will be drawn into the pump 84 through conduits 83c drawing the check valve 87c closed and pumped out into conduit 83d, forcing check valve 87d open, into conduit 83b and finally out of the assembly through conduit 86. When the direction of rotation of the transmission is reversed the pump rotation correspondingly reverses and the fluid follows the direction as shown by the dotted arrows and the check valves assume positions shown by the dotted lines. It should be understood, however, that other type pumps having direction sensitive means may be used instead of the pump illustrated.

The pump 84 feeds two control pressure lines or conduits 88 and 90 both of which feed into the ratio control valve assembly, as will be more fully explained below. The conduit 90 is connected to one side of the pump assembly 80 so that during a forward direction of transmission rotation and pump 84, designated by arrow R in FIG. 4, fluid pressure will flow through conduit 90 and for a reverse direction of transmission rotation, designated by dotted arrow R′, a negative pressure will develop at conduit 90 due to the fact that the pump is drawing fluid pressure from the direction of conduit 90 and conduit 83b. So it can be seen, that for one direction of transmission rotation, conduit 90 is pressurized while for a reverse direction of transmission rotation conduit 90 is not pressurized.

Figure 5:
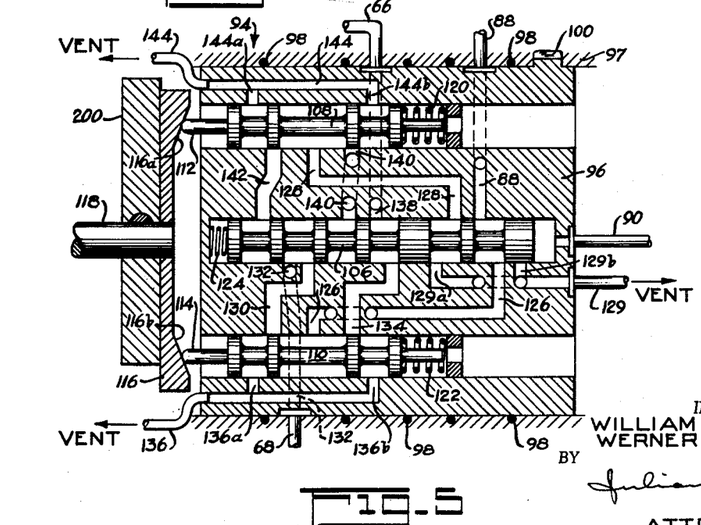
FIG. 5 is an enlarged sectional view of the ratio control valve assembly shown in FIG. 3.

The ratio control valve assembly generally designated 94 comprises a rotatable body 96 which is mounted so as to be capable of rotating about its longitudinal axis and said rotatable body may be mounted in a housing designated at 97. Suitable seals 98 may be provided between the rotatable body 96 and its supporting structure to prevent leakage of hydraulic fluid therebetween (FIG. 5). The seals 98 may be eliminated, however, when close tolerances are used between the mating elements 96 and 97. The ratio control valve assembly 94 may have means connected thereto for automatically or manually rotating said assembly which may comprise, for example, manual means comprising a gear sector 100 supported on the rotatable body 96 and meshing with a series of gear members 102a, 102b and 102c, the latter gear 102c having a manual selector wheel or lever 104 connected thereto. Thus, it can be seen that turning of the selector wheel 104 will in turn cause the rotatable body 96 to rotate about its longitudinal axis which, as will be further explained below, serves to change the speed-ratio position of the rollers 20.

Slidably mounted for linear movement within the rotatable body 96 are a reversing valve 106 (FIG. 5) positioned substantially along the axis of the outer body 96 and two ratio control valves or servo valves 108 and 110, respectively positioned along axes eccentric to the rotatable body axis. The valves 108 and 110 each have a pin-type projection 112 and 114, respectively, which operatively engages a cam member 116 supported on a shaft extension 118 of pivot shaft 50. The surfaces 116a and 116b of cam member 116 are designed so that translational movements of pivot shaft 50 are directly transmitted to the valve members 108 and 110 to slide them within the rotatable body 96 while pivotal movements or speed-ratio-changing movements of pivot shaft 50 are transmitted by way of the inclination of the cam surface 116a and 116b to the valve members 108 and 110 to also slide said valve members within rotatable body 96. It will now be apparent that inducing rotational movement of rotatable body 96 about its axis through selector member 104 will also cause the valve members 108 and 110 to slide or move linearly within the rotatable body 96 due to the inclination of the surfaces 116a and 116b of cam member 116 and the relative rotation of the valve pins 112 and 114 with respect to the inclined surfaces 116a and 116b.

Figure 6:
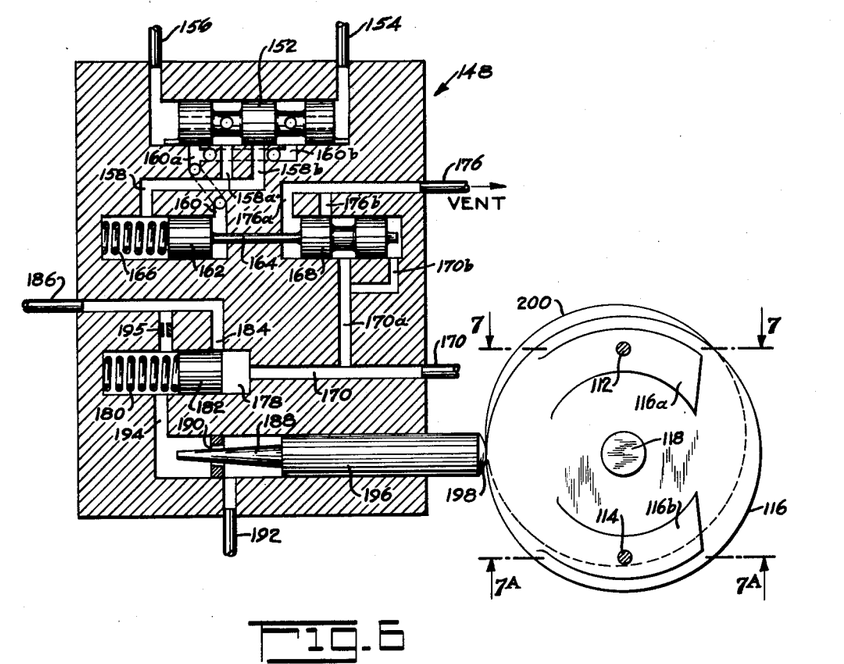
FIG. 6 is an enlarged sectional view of the control pressure assembly shown in FIG. 3, and FIGS. 7 and 7A are sectional views taken along line 7—7 and lines 7A—7A of FIG. 6, respectively.

Referring more specifically to FIGS. 6, 7 and 7A it can be seen therein that the cam surfaces 116a and 116b are circumferentially spaced on the cam member 116 and are inclined with respect to the face of the body of cam member 116 such that, as the cam member 116 or the control valve assembly 94 is rotated, the pins 112 and 114 will slide in the rotatable body 96 with their direction of movement depending upon the direction of relative rotation. The inclined surfaces 116a and 116b are oriented with respect to each other so that during one direction of said relative rotation each of the pin members will slide on its respective cam surface in opposite directions, that is, as pin member 112 slides toward the high portion of its cam surface 116a due to a clockwise rotation of outer body 96 (FIGS. 6 and 7A) the pin member 114 will slide toward the lower portion of its cam surface 116b. So it can be seen that the low portion of cam surface 116a is connected to the low portion of cam surface 116b by one segment of the face of cam member 116 and the high portions of the cam surfaces 116a and 116b are likewise connected by another segment of cam member 116. The cam surfaces 116a and 116b need only extend over a portion of the cam member 116, as illustrated, since the relative rotation of the control valve assembly 94 and cam member 116 need only be a relatively small part of a complete revolution of either of said members to produce sufficient axial or linear movement of the control valve members 108 and 110 for varying the control pressure to the cylinders 70 and 72, in that the working range of the servo valves is normally within a few thousandths of an inch. However, the cam surfaces 116a and 116b may extend over the entire surface of cam member 116, if desired. Return springs 120 and 122 are mounted at the ends of valve members 108 and 110, respectively to insure that said valve members will be maintained in abutting relationship with the cam surfaces 116a and 116b at all times.

The reversing valve 106 is provided with a spring 124 at its lower end or the end nearest cam member 116 as viewed in FIG. 5. The spring 124 normally biases the reversing valve 106 in a right hand direction or in a direction away from cam member 116, as also viewed in FIG. 5. However, the spring 124 is such that the spring pressure is always less than the force exerted by the fluid pressure from conduit 90 on the uppermost land of the reversing member 106 during reverse operation. If the conduit 90 is not pressurized, the spring 124 forces the reversing valve member 106 to slide in the direction of bias of the spring 124 or to the right as viewed in FIG. 5. As illustrated in FIGS. 3 and 5, assuming the transmission to be operating in reverse and conduit 90 therefore pressurized, the valve member 106 will be forced to slide against the pressure of spring 124 and assume the position shown in FIG. 5. In this position the fluid pressure from conduit 88 will flow across the reversing valve member 106 to conduit 126 for supplying fluid pressure to control valve member 110. When the direction of rotation of the transmission is changed from reverse operation, conduit 90 will no longer be pressurized and the spring pressure from spring 124 will slide the reversing valve member 106 in a direction away from the cam member 116 as viewed in FIG. 5. The conduit 126 will then be shut off from the pressure conduit 88 and conduit 128 will now be opened to communicate with pressure conduit 88 for supplying fluid pressure to the control valve member 108. Thus, it can be seen that the reversing valve member 106 serves to connect the fluid pressure to one of the control valves 108 or 110 depending upon the direction of rotation of the transmission and that one of the control valves 108 or 110 is supplied with fluid pressure for forward direction of rotation while the other of said control valves is supplied with fluid pressure for reverse direction of rotation. By this means, if the transmission rotation is changed at any time, the higher pressure of the differential control pressure fed from one of the control valves 108 or 110 through reversing valve 106 and acting on cylinders 70 and 72 will be reversed so that the tangential traction forces, which will also be in the opposite direction, may be opposed to produce properly oriented speed-ratio-changing movements of the rollers. The reversing valve 106 also has a vent conduit 129 with vent branch conduits 129a, 129b connected thereto such that when said reversing valve is in the position illustrated in FIG. 5 the supply circuit comprising conduit 128 to control valve 108 will be vented or drained by means of vent branch 129a thereby rendering control valve 108 functionally inoperative. When the reversing valve 106 is in the position for supplying control valve 108 with fluid pressure, the vent branch 129b will drain supply conduit 126 to vent the circuit to control valve 110 and control valve 110 will thereby be functionally inoperative. Therefore, it can be seen that when one control valve 108 or 110 is supplied with pressure, the supply circuit to the other of said control valves will be vented and said other control valve will be functionally inoperative.

Assume now that the transmission is rotating in a direction so that fluid pressure will flow through conduit 90 to force the reversing valve 106 to the position shown in FIG. 5. The control pressure from conduit 88 will therefore flow across the valve 106 to control valve 110 by way of conduit 126. If the control valve assembly 94 is now rotated clockwise by means of selector 104, the pin 114 of control valve 110 will slide toward the low portion of cam surface 116b forcing the control valve 110 to slide axially toward the left, as viewed in FIG. 5. Conduit 126 will now communicate with conduit 130 permitting the control pressure to flow in the direction of the reversing valve 106 into conduit 132 which terminates at an annulus extending around the rotatable body 96 to which in turn communicates a control pressure conduit 68 leading to cylinder 70 thereby applying control pressure to the piston face 74 of pivot shaft 50. At the same time, control pressure conduit 134 will be closed off from conduit 126 but will be opened by one of the lands on valve 110 to communicate with a vent conduit 136, in particular a branch 136b of said vent conduit. Control pressure conduit 134 communicates at its other end with a conduit 138 which in turn empties into an annulus extending around rotatable body 96 and to which control pressure conduit 66 is connected. Therefore, it will be apparent that, when conduit 134 is vented to vent line 136, the control pressure in conduit 66 and cylinder 72 will be reduced and that the differential pressure between cylinders 70 and 72 will be such that a greater pressure exists in cylinder 70. As the fluid pressure force in cylinder 70 unbalances the tangential traction forces, the pivot shaft 50 will translate to the right, as viewed in FIG. 5 and therefore bring about a speed-ratio-changing movement toward an overdrive or high speed-ratio position.

If the selector 104 is rotated to cause the control valve assembly to rotate counterclockwise the pin 114 will ride toward the high portion of cam surface 116b thereby permitting the control valve 110 to slide in a direction toward the right as viewed in FIG. 5. The conduit 130 will now be cut off from control pressure conduit 126 by one of the lands of the control valve 110 while another of the valve lands will open conduit 134 to the conduit 126 and the control pressure will flow through conduit 134 back toward the reversing valve 106 where it will communicate with conduit 138. The conduit 138 terminates in an annulus extending around a portion of rotatable body 96 said annulus communicating with control pressure conduit 66 leading to cylinder 72 where the control pressure acts on piston face 76 of pivot shaft 50. Since the valve 110 has moved to the right with respect to its position shown in FIG. 5, the conduit 130 will now be open to the vent branch 136a of vent conduit 136 to reduce the fluid pressure in cylinder 70 in that the conduit 130 communicates with cylinder 70 through conduits 132 and 68. Therefore, the differential pressure between cylinders 70 and 72 will now be such that a greater pressure exists in cylinder 72 because conduit 66 will be pressurized while conduit 68 is reduced in pressure. Since the pressure in cylinder 70 is reduced, the tangential traction forces and the fluid pressure force acting on cylinder 72, which oppose the force acting on cylinder 70, will now begin to take over and cause a speed-ratio-changing movement of the rollers toward their underdrive positions. As will be explained in greater detail below, speed-ratio movement of the rollers also serves to position the control valves 108 and 110 to a point that will result in a differential pressure to satisfy the torque load.

Assuming now that the direction of rotation of the transmission is reversed, as explained above, conduit 90 will no longer be pressurized and the reversing valve 106 will now slide in response to pressure from spring 124 in a direction opposite to that resulting from the previously applied control pressure force from conduit 90. When the reversing valve is in this position, the pressure conduit 88 will no longer communicate with the conduit 126 since one of the lands on reversing valve 106 will have moved to a position between the two conduits 88 and 126. However, the movement of reversing valve 106 will now open conduit 128 for communication with pressure conduit 88 which serves to supply the fluid pressure to control valve 108. It should be understood that for a reversal of transmission rotation from the direction described above, the tangential traction force F will now act in the opposite direction. Therefore, a control force opposing the traction forces in this case will have to be applied to cylinder 72 whereas above an opposing control force was applied to cylinder 70.

If the selector 104 is now rotated to produce a clockwise rotation of control valve assembly 94 the pin 112 of control valve member 108 will slide on cam surface 116a toward the high point of said cam surface thereby forcing control valve member 108 to slide axially in a direction toward return spring member 120 or to the right, as viewed in FIG. 5. The conduit 128 leading from reversing valve 106 will now be in communication with conduit 140 which, due to the raised position of reversing valve 106, will in turn be in communication with conduit 138 leading to conduit 66 and cylinder 72 by means of an annulus extending around the rotatable body 96. Due to this movement of valve member 108, conduit 142 will be opened to a vent branch 144a of vent conduit 144, so that the circuit to cylinder 70 will be vented, that being conduits 142, 132 and 68. It should also be noted that conduit 134 leading to valve member 110 will be closed off from conduits 140 and 138 by a land on valve member 106 so that no pressure may flow back to valve member 110 when the valve member 108 is operative.

When the selector 104 is rotated to produce a counterclockwise rotation of the control valve assembly 94, the pin 112 will ride toward the lower end of cam surface 116a and the control valve member 108 will correspondingly slide axially in a direction away from spring 120, or to the left as viewed in FIG. 5, the spring pressure maintaining the pin 112 in contact with said cam surface. In this case conduit 128 will now be in communication with conduit 142 leading from control valve 108 back toward reversing valve 106 where, due to the raised position of said reversing valve, the conduit 142 will be in communication with conduit 132 which in turn communicates with conduit 68 through an annulus similar to those described above and the fluid pressure will now be supplied to cylinder 70. In this case conduit 140 will be opened to a vent branch 144b of vent conduit 144 and the circuit comprising conduits 140, 138, 66 and cylinder 72 will be vented. Also conduit 130 will be blocked by a land on reversing valve 106 so that fluid pressure from conduit 142 to conduit 132 will not flow through conduit 130 to valve member 110.

Therefore, it can be seen, that for any direction of torque, the control valve assembly may be rotated to bring about a differential control pressure which will always be properly oriented for opposing the tangential traction force.

The control system further provides for a novel feedback system which eliminates "hunting" of the rollers about a desired speed-ratio position selected by selector means 104. Reference may be made to the aforementioned co-pending application for a more detailed dscription of roller hunting. As stated above the present invention eliminates this condition by means of a novel feedback means incorporated in the control system.

As described above and illustrated in FIGS. 3 and 5, the relationship of the cam member 116 and the control valve assembly 94 is such that relative translational and rotary movements of these elements are transmitted to the control valves 108 and 110 which cause said control valves to slide axially within the rotatable body 96 of control valve assembly 94 for varying the control pressure to the cylinders 70 and 72. As further described above, translation of the rollers 20 may be initiated by causing the control valve assembly to rotate relative to the cam member 116 thereby inducing the rollers to rotate to a new speed-ratio position.

As the roller pivot shafts 50 translate due to the control pressure acting on one of the cylinders 70, 72 and therefore rotate the rollers 20, the cam member 116 will also translate and rotate with pivot shaft 50 since it is directly connected to pivot shaft 50 through shaft extension 118. The system is arranged such that an initial axial displacement of the control valves 110, 108 for changing the speed-ratio of the transmission is varied by the translational and rotary movements of the pivot shaft 50 through cam 116 to bring the control valve members back toward their original position so as to maintain the desired speed-ratio position. Thus, after the control pressure is initially varied any resulting translational movement acts to reduce the initial control pressure differential and the rollers will approach their new speed-ratio positions at a reduced rate of movement or in other words, the rate at which the rollers move to a new speed-ratio position is reduced as the rollers approach said position so that said rollers are effectively slowed up and therefore will not overshoot or oscillate about the desired speed-ratio position.

For example, assume that the control valve 110 is being supplied with fluid pressure from reversing valve 106. If the selector 104 is rotated in a counterclockwise direction as viewed from above said selector, the control valve assembly 94 will be rotated clockwise relative to cam member 116 and the control valve member 110 will slide toward the low point of cam surface 116b thereby causing the control valve member to slide axially in a direction toward the left, as viewed in FIG. 5. As explained above, this will allow control pressure to flow into conduit 68 and to cylinder 70 and at the same time reducing control pressure at cylinder 72 thereby inducing the pivot shaft 50 to translate toward the right, as viewed in FIG. 3. In translating to the right the pivot shaft 50 through its associated cam member 116 will cause the control valve member to slide axially in the opposite direction of that originally induced by the original selection and as the control valve member is slid back toward its original position the control pressure differential causing the translation of pivot shaft 50 will be gradually reduced. Likewise, as the roller 20 begins to pivot in speed-ratio-changing movement which in this case would produce a clockwise rotation of pivot shaft 50 and cam member 116, as viewed in FIGS. 5 and 6, the cam surface 116b will rotate with respect to control valve 110 such that said cam surface contact with the pin 114 of said control valve will approach the high point of said cam surface. Thus, the control valve 110 will also be forced back toward its original position by the rotary or pivotal movement of the rollers to further decrease the control pressure differential. Since the control pressure differential, originally induced by rotating the selector 104, will now be reduced substantially to its original value, the forces on the rollers will be such as to balance said rollers at the new speed-ratio position without any overshooting or oscillating of the rollers. Any deviation from said speed-ratio position will be fed back through the cam 116 and servo valves 108 and 110 to produce an opposite force to the force producing said deviation and thereby substantially immediately restore the rollers to said speed-ratio position.

It is apparent therefore, that the feedback system, as described above, will serve to stop the rollers 20 at the desired speed-ratio position selected by the selector 104 without any "hunting" of the rollers about said position. The feedback system serves to vary the servo valve position and thus vary the control pressure differential in the control system by not only feeding back responses from the pivotal movement of the rollers, which has been incorporated in some prior feedback systems, but also by feeding back the translational movement of the rollers. It has been found that the feeding back from both movements of the rollers completely eliminates "hunting" whereas in the prior systems this was not possible.

The control system also comprises a control pressure assembly, generally designated at 148, for balancing the pump outlet pressure so that the control pressure feeding to the cylinders 70 and 72 is always maintained within desirable limits with a minimum amount of energy being required to operate the pump. The two control pressure circuits 66 and 68 are connected to a shuttle valve 152 by means of conduits 154 and 156, respectively. The differential pressure between the control circuits 66 and 68 causes the shuttle valve 152 to assume a position at one of its two axial stops in accordance with the higher of the two pressures from the control circuits. Thus, as viewed in FIG. 6, the higher pressure would be flowing from control circuit 68 through conduit 156 to force the shuttle valve axially to the right, as viewed in said figure. The conduit 158, with branch conduits 158a, 158b and conduit 160 with branch conduits 160a, 160b are oriented such that the greater of the two pressures from conduits 154, 156 always acts through conduits 158 to one side of the differential piston 162 of pressure regulator valve 164 while conduit 160 supplies any pressure which may come from the low pressure line to the opposite side of differential piston 162. Thus as shown in FIG. 6, the higher pressure will always act on the left side of the differential piston 162, as viewed in said figure tending to force the pressure regulator valve to the right.

The force acting on the differential piston 162 from the high pressure conduit 158 is augmented by a spring 166 which exerts a predetermined spring pressure on the differential piston 162 to satisfy minimum running pressure requirements which, for example, in one transmission unit of a particular size may be 150 p.s.i. These two forces, the spring force and high pressure force, are balanced by the hydraulic pressure exerted on the supply pressure control valve 168 of the pressure regulator valve 164. A conduit 170, which may be connected to conduit 86, transmits fluid pressure from the pump 80 to the control pressure assembly 148. A pressure relief valve 172 (FIG. 3) is connected into conduit 170 for limiting the maximum pressure required for transmission operation which in the example unit may be 500 p.s.i. and said pressure relief valve may have a vent conduit 174 connected thereto for venting the conduit 170 when the pressure in said conduit exceeds the desired limit. The conduit 170 feeds branch conduits 170a and 170b leading to the supply pressure control valve 168 thereby applying an opposing force to the above mentioned forces acting on differential piston 162. A vent conduit 176 with branch conduits 176a, 176b is connected to the supply pressure control valve 168 for venting the conduits 170a and 170b when the pressure from said conduits is such as to cause an unbalance in the pressure regulator valve assembly 164. So it can be seen that the pump outlet pressure or the supply pressure will be balanced so that it is proportional to the differential control pressure acting on differential piston 162 which is proportional to the transmission torque plus a constant pressure from the spring 166.

The pump supply pressure is also connected to a loader pressure valve 178 by means of conduit 170, as illustrated in FIG. 6. A spring 180 serves to oppose the pump pressure and acts on the valve piston 182 with a force equal to the pressure generated in conduit 170 at an idling or minimum load condition by spring 166, which in the example unit may be 150 p.s.i. The conduit 170 supplies fluid pressure to an orifice 184 of a conduit 186 according to the position of the piston 182 which will vary the opening of orifice 184 according to the differential forces acting on both sides of said piston. It will be apparent therefore, that the spring 180 subtracts a pressure from the supply pressure in conduit 170 which is equal to the pressure generated by spring 166, the purpose of which will be more fully explained below. The pressure from conduit 186 serves to aid in biasing the input disc 16 against the rollers 20 in a manner which will also be more fully explained below. A needle valve 188 is positioned for changing the opening of an orifice 190 and vent conduit 192 is connected thereto for draining off any fluid passing through the variable orifice 190. The needle valve 188 and its associated orifice 190 are connected to conduit 186 by means of conduit 194 having a fixed restriction 195 in one portion thereof. As illustrated the pressure in conduit 186 is of a magnitude which will vary according to the position of the needle valve 188 in the variable orifice 190. The needle valve 188 is provided with a stem portion 196 which extends axially beyond the outer surface of the outer body 150, as shown in FIGS. 3 and 6. The stem portion 196 has a substantially rounded cam engaging surface which as shown in said figures, abuts cam member 200 carried by pivot shaft extension 118. The cam member 200 may be a separate cam member from cam member 116 or made integral therewith but for illustration purposes the cam member 200 is shown as a separate cam.

The operation of valve 178 is as follows. A pressure is generated in conduit 170 which is varied according to the position of the valve 168. It will be apparent from the above description that the valve 168 varies the pressure in conduit 170 according to the differential pressure in the cylinders 70 and 72 which is a function of transmission torque. Therefore, the pressure in conduit 170 delivered to valve 178 is also a function of transmission torque. When the pressure in conduit 170 to valve 178 is at a minimum, for example 150 p.s.i., an initial pressure drop of 150 p.s.i. will exist between conduits 170 and 186 with the orifice 190 of needle valve 188 being in its minimum opening condition. In this situation the valve piston 182 is balanced and the pressure in conduit 186 will therefore be 150 p.s.i. less than the pressure in conduit 170. The pressure differential between conduit 170 and 184 will remain constant for any pressure existing in conduit 170 above 150 p.s.i. as long as the needle valve 188 is at the minimum opening position in orifice 190. As the needle valve 188 is retracted, further opening orifice 190, there will be an increasing flow across 190. Due to the connection between conduit 186 and orifice 190 through restriction 195 and conduit 194, the pressure on the spring side of valve piston 182 will decrease and therefore decrease the pressure drop across orifice 184. This results in a decrease in the differential pressure between conduits 170 and 184 allowing pressure in conduit 184 to approach the pressure in conduit 170 as the pressure in conduit 170 increases. This will increase the pressure delivered to conduit 186 and thus an increase in pressure to input disc 16. Thus, the pressure in conduit 186 is proportional to the pump outlet pressure and the force of spring 180 and modified by the position of needle valve 188.

As is apparent from FIGS. 3 and 6, any rotary or pivotal motion of the pivot shaft extension 118 caused by speed-ratio changing movement of the rollers 20 will be transmitted to needle valve 188 through the cam member 200 and stem portion 196, thereby varying the orifice 190 in proportion to the position of the rollers 20. Therefore, the pressure in conduit 186 is also a function of the roller position or speed-ratio position. The system is designed such that when the pressure is the greatest in conduit 186, that is, when the needle valve is substantially at its maximum opening position, the rollers 20 are in a position of high speed-ratio or high output to input ratio. It should be noted that the pressures indicated herein will vary according to the power requirement of a particular transmission and said pressures as given are only used as examples for purposes of clarity of description. Also in FIG. 6 the cams 116 and 200 have been shown in a different plane from that of FIGS. 3 and 5 for purposes of illustration.

The input and output shaft bearings 30 and 32 are designed to carry axial thrust loads as well as radial loads. A fluid actuated means comprising an annular piston 202, which may be of the type disclosed in co-pending application Serial No. 94,188, filed March 8, 1961 or of a type shown in United States Patent 3,008,337 issued November 14, 1961 is co-axially disposed about the input shaft 12 between the outer race of the bearing 30 and housing end section 34. The piston 202 is fitted within the housing end section 34 to form an annular cylindrical space 204 to which is supplied a fluid pressure derived from the controlled pressure in the output line 186. The annular cylindrical space 204 is sealed for preventing fluid leakage by means of seals 206.

The fluid pressure behined the piston 202 is supplied through conduit 186. A check valve 208 may also be provided, as illustrated, which is designed to open wide when fluid under pressure flows into the cylindrical space 204 so as to offer little or no restriction to such flow. However, when fluid tends to flow out of the space 204, the check valve closes except for a restricted-by-pass passage 210 whereby the pressure on the piston 202 can only decrease slowly bit it can increase relatively quickly.

From the above description, it can be seen that the ratio bias valve 178 and the needle valve 188 serve to control the pressure to the piston loader 202 in accordance with the speed-ratio position of the rollers 20. Further, as explained above the pressure in conduit 186 is greatest when the rollers are in high speed-ratio position and therefore insures that roller contact pressure with input disc 116 will be maintained in said high speed-ratio position at which time the contact pressure has a tendency to decrease, as explained in said co-pending application Serial No. 94,188.

A control pressure limiting device is also provided which may comprise a plurality of check-type valves 212 and 214 (FIG. 3). The valve 212 may be connected across control pressure conduits 156 and 154 and is oriented such that when the differential pressure is higher in conduit 156, if the pressure is said conduit 156 reaches a predetermined value, the valve 212 will open and bleed off the pressure from conduit 156 to conduit 154 which is at a lower pressure. Thus, the control pressure in conduit 156 which opposes the tangential traction force, will be reduced and the tangential traction force will then cause the rollers to pivot toward their underdrive or low speed-ratio position. The valve 214 is connected from conduit 154 to conduit 156 so that when the direction of transmission rotation is reversed and when the higher of the differential pressures is in conduit 154, the valve 214 will bleed off the high pressure to conduit 156 at a pre determined pressure value in said conduit 154. If the valve 214 is opened, as when the pressure in conduit 154 exceeds said predetermined value, the control pressure force in conduit 154 which opposes the tangential traction force, will be reduced and, as in the case explained above the rollers will pivot toward an underdrive or low speed-ratio position. The pressure limiting device has for its purpose reducing the possibility of damaging the transmission due to overload. Such overloads may be due to a jamming of the device driven by the transmission or load demands imposed on the transmission which are beyond its power requirements. When such overloads occur, the pressure limiting device takes over to automatically reduce the speed-ratio output of the transmission to an underdrive position at which time the speed-ratio output is consequently reduced, thereby reducing the possibility of damaging the transmission. Also, in the case of load jamming of the driven device, the possibility of damaging the driven device is reduced when the transmission speed-ratio output is reduced.

A cam and sprag device 216 is provided between the input shaft 12 and the relatively moveable input disc 16, as illustrated in FIG. 1, and may be of the type clearly disclosed in said co-pending application Serial No. 94,188 filed March 8, 1961. As stated in said co-pending application, the cam and sprag device serves to transmit torque from the input shaft through said cam and sprag device to axially urge the input disc 16 and the output disc 18 toward each other and against rollers 20.

A damping mechanism 218 (FIG. 3) may be provided on a pivot shaft extension 220 for preventing a sudden change in speed-ratio position of the rollers due to any rapid fluctuation in torque. The damping mechanism 218 comprises a piston 222 supported on pivot shaft extension 220 for axial movement in a fluid-filled cylinder 224 which has suitable seals 226 for retaining the fluid in said cylinder 224. A relatively small aperture or passageway 228 is provided in piston 222 for permitting limited flow of the fluid from one face of piston 222 to the other face of said piston. Thus, any sudden axial movements of pivot shaft 50 will be dampened so that a gradual axial movement of said pivot shaft will take place as the trapped fluid in cylinder 224 flows through passageway 228 toward a face of the piston 222 in response to movement of said piston 222 within the cylinder 224. The damping mechanism shown in FIG. 3 is only illustrative of one type damping mechanism which may be used and the damping mechanism itself forms no part of the present invention and is not essential thereto. Reference may be made to United States Patent, 3,048,047 issued August 7, 1962, for a more complete description of the function of the damping mechanism and wherein another form of damping mechanism which may be used in the present invention is shown.

As explained above the hydraulic pressures described herein are intended to be exemplary only and it should be understood that other factors as well as modifications may vary the hydraulic pressure requirements within the system and the invention is not intended to be limited to the specific hydraulic pressures described herein. It should also be understood that the control pressures could be applied by a gaseous fluid instead of a fluid in a liquid state.

While we have described our invention in detail in its present preferred embodiment it will be obvious to those skilled in the art, after understanding the invention, that various changes and modifications may be made therein without departing from the spirit and scope thereof. We aim in the appended claims to cover all such modifications.

We claim:
1. A control system for variable speed transmissions having co-axial input and outpue members with facing toric surfaces and a plurality of circumferentially-spaced rollers disposed between and in driving contact with said surfaces for transmitting torque from the input member to the output member, support means for each roller including a pivot shaft providing for speed-ratio changing pivotal movement of said rollers across said toric surfaces, each said roller pivot shaft being supported for translational movement along its axis for initiating speed-ratio pivotal movement of said rollers, said control system comprising; cam means connected to one of the roller pivot shafts for pivotal and translational movement therewith, means including valve means for applying a fluid pressure force axially against said roller pivot shafts such that changes in the relative magnitude of the fluid pressure force on each roller pivot shaft or the toric surface traction forces on its associated roller causes translational movement of the roller pivot shaft, said valve means operatively engaging said cam means, means operable for rotating said valve means relative to said cam means for producing linear movement of the valve means in one direction or the other depending on the direction of rotation, said valve means being effective in response to linear movement in either direction for changing the fluid pressure force acting against the roller pivot shafts to cause translational movement of each of said shafts thereby inducing speed-ratio-changing movement of the rollers with accompanying pivotal movement of their pivot shafts, and the operative engagement between the cam and valve means being such that said translational movement of said one roller pivot shaft and the resulting pivotal movement of said shaft are both effective through said cam means to linearly move the valve means in the opposite direction from that producing said fluid pressure change.

2. A control system for variable speed transmissions as recited in claim 1 wherein said valve means comprises two servo-valve members each being capable of varying the fluid pressure to said roller pivot shafts and means for operatively connecting one of said servo-valves to a source of fluid pressure for one direction of transmission rotation and for operatively connecting the other of said servo-valves to said source of fluid pressure for a second direction of transmission rotation.

3. A control system for variable speed transmissions as recited in claim 2 wherein said means for operatively connecting said servo-valve means to said source of fluid pressure comprises reversing valve means and means responsive to the direction of transmission rotation for connecting and disconnecting fluid pressure to said reversing valve means for varying the position of said reversing valve means so that for one direction of transmission rotation said fluid pressure causes said reversing valve to assume a position wherein said one of said servo-valves is operatively connected to said source of fluid pressure and for a second direction of transmission rotation said fluid pressure is disconnected from said reversing valve means and said reversing valve means thereby assumes a position wherein said other of said servo-valves is operatively connected to said source of fluid pressure.

4. A control system for variable speed transmissions as recited in claim 3 wherein said cam means comprises a cam member having two spaced inclined cam surfaces thereon one for and operatively engaging each of said servo-valves and said inclined cam surfaces being disposed on said cam member such that during relative rotation between said cam member and said servo-valve means, said servo-valves will follow opposite paths of inclination on their respective inclined cam surface.

5. A control system for variable speed transmissions as recited in claim 1 further comprising fluid pressure regulator means operatively connected to a source of fluid pressure and to each end of each of said roller pivot shafts for regulating the output of said source of fluid pressure for said roller pivot shafts.

6. A control system for variable speed transmission as recited in claim 5 wherein said fluid pressure regulator means comprises a pressure regulator valve connected to said source of fluid pressure and having means for balancing the output fluid pressure from said source in accordance with the pressure regulator valve position, said pressure regulator valve also having a valve member connected thereto and being biased so as to balance said fluid pressure to said pressure regulator valve by a predetermined amount, shuttle valve means operatively connected to the fluid pressure supplied to each end of one of said roller pivot shafts for supplying the higher of said pressures supplied to said one roller pivot shaft to one side of said valve members for further biasing said valve member so that the pressure regulator valve is positioned in accordance with the pressure from said roller pivot shaft and thereby balances the output fluid pressure from said source an amount substantially equal to the bias on said pressure regulator valve.

7. A control system for variable speed transmissions as recited in claim 5 further comprising fluid actuated means operatively connected to said source of fluid pressure and said fluid pressure regulator means for maintaining driving contact between said input and output members and said rollers and said control means including means for varying the fluid pressure to said fluid actuated means in response to the pivotal position of said rollers.

8. A control system for variable speed transmissions as recited in claim 7 wherein said means for varying the fluid pressure to said fluid actuated means comprises a first valve means for regulating the fluid pressure from said source of fluid pressure to said fluid actuated means by a predetermined amount, a second valve means having a variable orifice connected to said first valve means for producing a variable pressure drop in said first valve means such that said fluid pressure to said fluid actuated means is further regulated by said second valve means and means for varying the orifice of said second valve means.

9. A control system for variable speed transmissions as recited in claim 8 wherein said means for varying the orifice of said second valve means comprises a needle valve positioned in said orifice and having an extended stem portion, said extended stem portion operatively engaging cam means connected to one of said roller pivot shafts such that as said roller pivot shaft is induced to pivot said needle valve will vary the opening of said variable orifice and thereby vary the fluid pressure to said fluid actuated means.

10. A control system for variable speed transmissions as recited in claim 1 wherein said means including valve means for applying a fluid pressure force axially against said roller pivot shafts includes means for applying fluid pressure to each end of each of said roller pivot shafts, said valve means being operative for varying the relative magnitude of the fluid pressure force to each end of each of said roller pivot shafts, pressure limiting means operatively connected between each end of each of said roller pivot shafts for limiting the fluid pressure force to a predetermined amount, and said pressure limiting means being operative when said fluid pressure force exceeds said predetermined amount for automatically reducing the higher fluid pressure force at one end of each roller pivot and for automatically transferring the higher fluid pressure force to the other end of each roller pivot shaft such that said rollers are automatically moved toward a position of low output speed relative to input speed.

11. A control system for variable speed transmissions as recited in claim 10 wherein said pressure limiting means comprises two pressure limiting valves each being operatively connected between each end of each of said roller pivot shafts, and one of said pressure limiting valves being operative in response to pressure exceeding a predetermined amount to one end of each of said roller pivot shafts and the other of said pressure limiting valves being operative in response to pressure exceeding a predetermined amount to the other end of each of said roller pivot shafts such that when the pressure to either end of each of said roller pivot shafts exceeds a predetermined amount speed-ratio pivotal movement of said rollers toward a position of low output speed relative to input speed will be initiated.

References Cited in the file of this patent

UNITED STATES PATENTS

| | | |
|---|---|---|
| 3,008,337 | Kraus | Nov. 14, 1961 |
| 3,048,047 | Richardson | Aug. 7, 1962 |
| 3,087,348 | Kraus | Apr. 30, 1963 |